(12) United States Patent
Watanabe

(10) Patent No.: US 10,994,427 B2
(45) Date of Patent: May 4, 2021

(54) ROBOT WITH SAFETY FENCE AND ROBOT SYSTEM

(71) Applicant: Fanuc Corporation, Yamanashi (JP)

(72) Inventor: Hideyuki Watanabe, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 172 days.

(21) Appl. No.: 16/360,943

(22) Filed: Mar. 21, 2019

(65) Prior Publication Data

US 2019/0308334 A1 Oct. 10, 2019

(30) Foreign Application Priority Data

Apr. 5, 2018 (JP) .............................. JP2018-073282

(51) Int. Cl.
*B25J 19/06* (2006.01)
*B25J 9/16* (2006.01)

(52) U.S. Cl.
CPC .............. *B25J 19/06* (2013.01); *B25J 9/1676* (2013.01)

(58) Field of Classification Search
CPC . H04R 1/1041; H04M 1/0264; A61N 1/3603; G06F 3/03547; A61B 1/00098; A61B 2017/003; A61B 2017/2903; B65H 2511/212; B65H 2404/7414; A01D 34/828; B26D 7/01; Y10T 83/7697; Y10T 83/7726; Y10T 83/7788; Y10T 83/828; Y10T 83/853; H04W 88/02; A47C 1/03238;

(Continued)

(56) References Cited

U.S. PATENT DOCUMENTS 6,438,455 B2 * 8/2002 Matsumoto ............ B25J 9/1674
  318/567
6,459,956 B2 * 10/2002 Matsumoto .............. B25J 19/06
  318/563

(Continued)

FOREIGN PATENT DOCUMENTS

EP 1375088 A1 1/2004
EP 1892456 A1 2/2008

(Continued)

OTHER PUBLICATIONS

Shiraishi et al., Rotation trajectory self-teaching performance of measurement robot, 1998, IEEE, pg. (Year: 1998).*

(Continued)

Primary Examiner — McDieunel Marc
(74) Attorney, Agent, or Firm — Shackelford, Bowen, McKinley & Norton, LLP

(57) ABSTRACT

A robot with a safety fence includes: a base; a movable part having a base end supported to the base so as to be rotatable about a first axis, and a tip end performing operation on an operation target; and a safety fence rotated about the first axis together with the movable part, and disposed on a rear side opposite to a front side of the robot with a safety fence where the tip end of the movable part performs operation. The safety fence is disposed in a position radially closer to the first axis than the farthest distance the tip end of the movable part travels from the first axis on the front side, and a position radially farther away from the first axis than the farthest distance a portion of the movable part travels from the first axis during operation, on the rear side.

8 Claims, 3 Drawing Sheets

(58) Field of Classification Search
CPC ........... A47C 7/14; F16D 1/101; F16D 1/108; G11B 17/056; B25J 19/06; B60D 1/26; B60D 63/08; B65G 69/2882; E05B 81/54; E05C 17/02; F24C 3/124; F24C 3/126; G05D 1/0094; G05D 1/0231; G05G 1/08; G05G 1/12; G05G 2700/12
See application file for complete search history.

(56) References Cited

U.S. PATENT DOCUMENTS

| | | | | |
|---|---|---|---|---|
| 7,149,601 | B2* | 12/2006 | Murakami | B23K 20/123 700/245 |
| 7,577,498 | B2* | 8/2009 | Jennings | B25J 9/0084 141/100 |
| 2009/0030549 | A1* | 1/2009 | Sakai | B25J 19/06 700/245 |
| 2011/0224826 | A1* | 9/2011 | Maehara | B25J 9/1676 700/255 |
| 2012/0043831 | A1* | 2/2012 | Sakakibara | B25J 19/06 307/326 |
| 2015/0335531 | A1* | 11/2015 | Yuyama | B25J 21/00 141/18 |
| 2016/0136052 | A1* | 5/2016 | Koike | G05D 9/00 141/94 |
| 2016/0185405 | A1 | 6/2016 | Takanishi et al. | |
| 2017/0008177 | A1* | 1/2017 | Ebihara | B25J 19/0075 |
| 2017/0029049 | A1 | 2/2017 | Takanishi et al. | |
| 2017/0357242 | A1* | 12/2017 | Watanabe | B25J 9/1666 |
| 2018/0169853 | A1* | 6/2018 | Niedermeier | G05B 19/19 |
| 2018/0265296 | A1* | 9/2018 | Beckman | G06Q 10/083 |

FOREIGN PATENT DOCUMENTS

| | | |
|---|---|---|
| EP | 2366504 A2 | 9/2011 |
| JP | S61-061195 U | 4/1986 |
| JP | H04-061122 U | 5/1992 |
| JP | H05-050390 A | 3/1993 |
| JP | H06-126685 A | 5/1994 |
| JP | H06-155341 A | 6/1994 |
| JP | 2002-283277 A | 10/2002 |
| JP | 2004-230509 A | 8/2004 |
| JP | 2004-265163 A | 9/2004 |
| JP | 2004-291225 A | 10/2004 |
| JP | 2006-329263 A | 12/2006 |
| JP | 2009-262257 A | 11/2009 |
| JP | 2011-212831 A | 10/2011 |
| JP | 2012-040626 A | 3/2012 |
| JP | 2016-120584 A | 7/2016 |
| JP | 2017-019049 A | 1/2017 |
| WO | WO-9109354 A1 | 6/1991 |
| WO | WO-2015139841 A1 | 9/2015 |

OTHER PUBLICATIONS

Ogure et al., Risk Management Simulator for Low-powered Human-collaborative Industrial Robots, 2009, IEEE, p. 49-54 (Year: 2009).*
Vasic et al., Safety Issues in Human-Robot Interactions, 2013, IEEE, p. 197-204 (Year: 2013).*
Salmi et al., Advanced safety solutions for human-robot-cooperation, 2016, IEEE, p. 610-615 (Year: 2016).*
Matsuura, Yo; Notice of Reasons for Refusal; Japanese Patent Application No. 2018-073282; dated Mar. 31, 2020; 7 pages.
Pasona Group Inc.; Search Report by Registered Search Organization; Japanese Patent Application No. 2018-073282; dated Mar. 25, 2020; 31 pages.

* cited by examiner

ROBOT WITH SAFETY FENCE AND ROBOT SYSTEM

CROSS-REFERENCE TO RELATED APPLICATIONS

This application is based on Japanese Patent Application No. 2018-073282, the content of which is incorporated herein by reference.

TECHNICAL FIELD

The present invention relates to a robot with a safety fence and a robot system.

BACKGROUND ART

Heretofore, a robot system including a safety fence disposed in a position surrounding a robot has been known (for example, see PTL 1). In the robot system described in PTL 1, the position of the robot and the position of a virtual safety fence set as a virtual region are set in advance to prevent entry of the robot beyond the virtual safety fence.

CITATION LIST

Patent Literature

{PTL 1}
Japanese Unexamined Patent Application, Publication No. 2011-212831

SUMMARY OF INVENTION

An aspect of the present invention provides a robot with a safety fence including: a base; a movable part having a base end supported to the base so as to be rotatable about a first axis, and a tip end performing operation on an operation target; and a safety fence rotated about the first axis together with the movable part, and disposed on a rear side opposite to a front side of the robot with a safety fence where the tip end of the movable part performs operation, in which the safety fence is disposed in a position radially closer to the first axis than the farthest distance the tip end of the movable part travels from the first axis on the front side, and a position radially farther away from the first axis than the farthest distance a portion of the movable part travels from the first axis during operation, on the rear side.

Another aspect of the present invention provides: a robot system including: the robot with a safety fence of the above aspect; and a detector that detects an object different from the robot with a safety fence and located within a predetermined range from the base.

DESCRIPTION OF EMBODIMENTS

Hereinafter, a robot with a safety fence 100 of a first embodiment of the present invention will be described with reference to the drawings.

Figure 1:
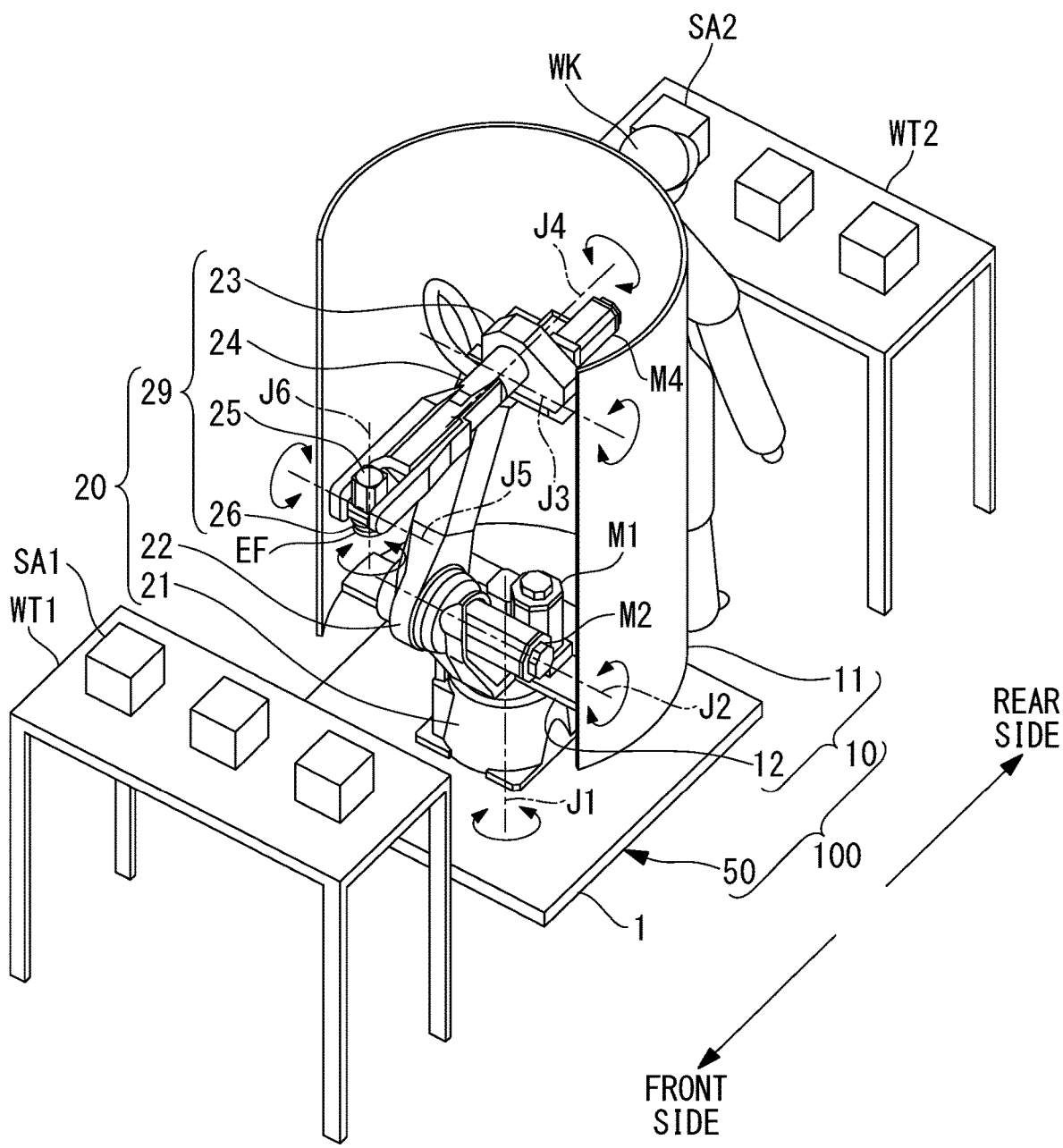
FIG. 1 is a schematic perspective view of a robot with a safety fence of an embodiment of the present invention.

FIG. 1 is a schematic perspective view of the robot with a safety fence (robot) 100 of the embodiment. The robot 100 of the embodiment includes a robot main body 50, and a safety fence 10 surrounding the outer periphery of a part of the robot main body 50. The robot main body 50 is a vertically articulated robot with six joints.

The robot main body 50 includes a base 1 fixed to a floor surface, and a movable part 20 supported to the base 1 so as to be rotatable about a vertical first axis J1. The movable part 20 includes a revolving drum 21 supported to the base 1 so as to be rotatable about the first axis J1, a first arm 22 supported to the revolving drum 21 so as to be rotatable about a horizontal second axis J2, and a movable tip end part 29 supported to the first arm 22 so as to be rotatable about a horizontal third axis J3.

The movable tip end part 29 includes a second arm 23 having a base end supported to the first arm 22 so as to be rotatable about the third axis J3, a first wrist element 24 supported to the second arm 23 so as to be rotatable about a fourth axis J4 skew to the third axis J3, a second wrist element 25 supported to the first wrist element 24 so as to be rotatable about a fifth axis J5 perpendicular to the fourth axis J4, and a third wrist element 26 supported to the second wrist element 25 so as to be rotatable about a sixth axis J6 perpendicular to the fifth axis J5. An end effector EF that performs operation on a work (operation target) SA1 and the like is attached to the tip end of the third wrist element 26.

Each joint includes a motor that rotates the joint, and an encoder (not shown) that detects a rotation angle of the motor. FIG. 1 shows a motor M1 that rotates the revolving drum 21, a motor M2 that rotates the first arm 22, and a motor M4 that rotates the first wrist element 24. Note that a motor that rotates the second arm 23, a motor that rotates the second wrist element 25, and a motor that rotates the third wrist element 26 are omitted from FIG. 1.

The robot main body 50 includes an unillustrated controller that controls the motors corresponding to the six joints. The controller includes a CPU, a ROM, a RAM, and a memory. The controller performs feedback control in which each motor is rotated by using the rotation angle of the motor detected by each of the encoders corresponding to the six joints.

Figure 2:
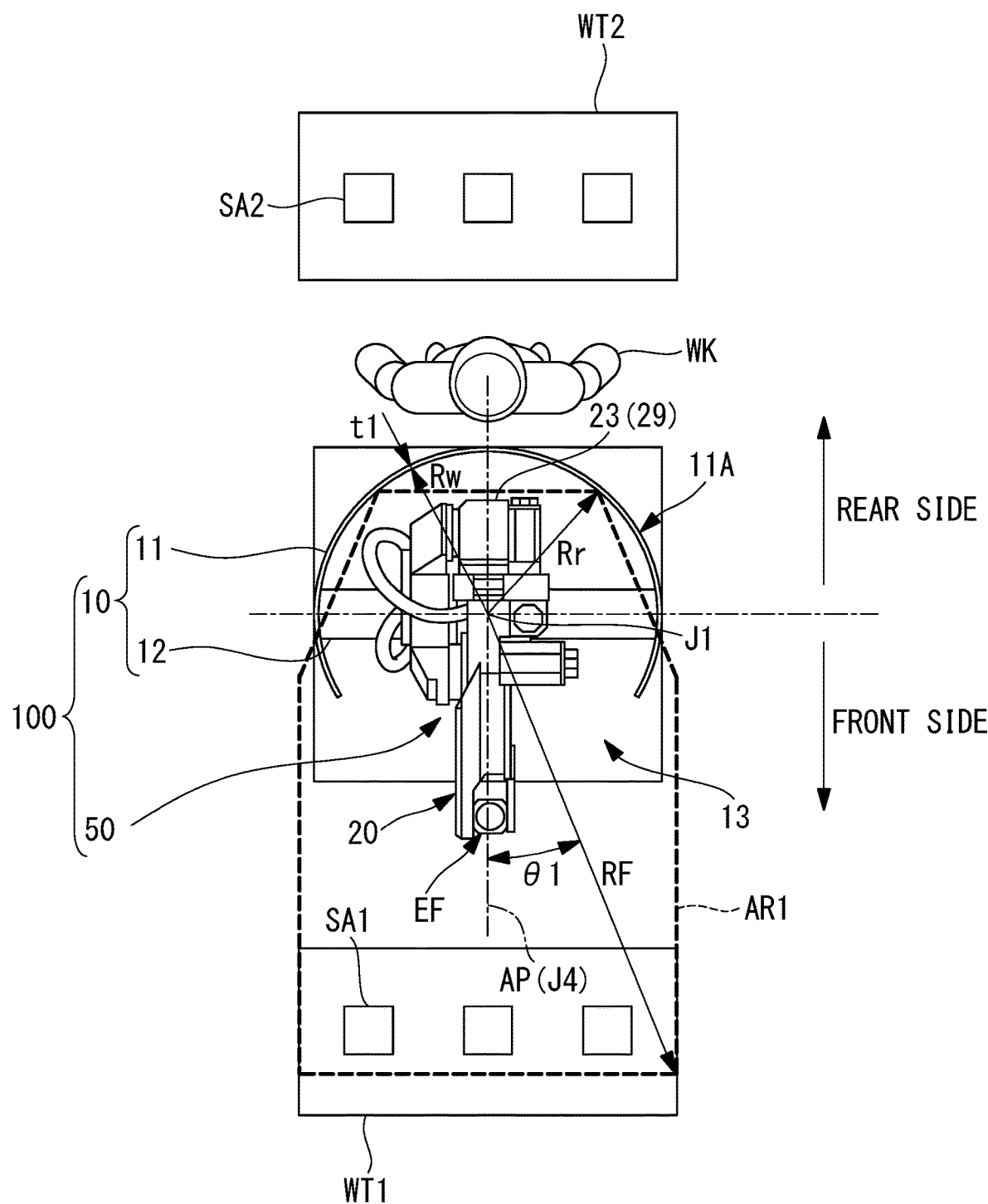
FIG. 2 is a schematic plan view of the robot with a safety fence shown in FIG. 1.

FIG. 2 is a plan view of the robot 100. As shown in FIG. 2, in the embodiment, the robot main body 50 is a robot in which the end effector EF is always located on an action plane AP that is a plane including the fourth axis J4. In the embodiment, on the action plane AP, the movable range of the movable part 20 during operation is set smaller on the rear side of the first axis J1, than on the front side thereof where the end effector EF performs operation on the work SA1.

Note that in the specification, the "front side" and "rear side" of the robot 100 vary depending on the angle of rotation of the movable part 20 about the first axis J1 relative to the base 1. One side of a plane including the first axis J1 and the second axis J2 (same plane as plane perpendicular to action plane AP in embodiment) where operation is performed is defined as the "front side," and the side opposite to the "front side" is defined as the "rear side." Accordingly, in the example shown in FIGS. 1 and 2, if the operation target of the robot 100 changes from the work SA1 placed on a work table WT1 to a work SA2 placed on a work table WT2, the movable part 20 rotates about the first axis J1 relative to the base 1. As a result, the "front side" and "rear side" shown in FIGS. 1 and 2 are reversed. That is, the "front side" and "rear side" of the robot 100 are determined according to the angle of rotation of the movable part 20 relative to the base 1.

As shown in FIG. 2, on the front side of the robot 100, during operation, the end effector EF moves to a position farthest away from the first axis J1 within an active region AR1. On the front side, the radius of the movable range of the end effector EF during operation in plan view is a maximum front radius RF. The maximum front radius RF is a range including the entire movable range of the movable part 20 on the action plane AP, when the movable part 20 rotates by an angle θ1 about the first axis J1 relative to the base 1, from a reference position of the movable part 20 shown in FIG. 2.

Meanwhile, on the rear side of the robot 100, of the movable part 20 during operation, the base end of the second arm 23 positioned at the base end of the movable tip end part 29 moves to a position farthest away from the first axis J1 within the active region AR1. As shown in FIG. 2, on the rear side, the radius of the movable range of the movable part 20 during operation in plan view is a maximum rear radius Rr smaller than the maximum front radius RF.

The safety fence 10 shown in FIGS. 1 and 2 includes a safety fence main body 11 that has an opening 13 where an arc as a part of a cylinder is cut out, and a fixing member 12 that fixes the safety fence main body 11 to the revolving drum 21. The fixing member 12 fixes the safety fence main body 11 to the revolving drum 21 such that the center axis of the safety fence main body 11 coincides with the first axis J1. The safety fence main body 11 is disposed in a position surrounding the entire rear side and a part of the front side of the robot main body 50, extending over angle ranges symmetrical on both sides of the action plane AP.

As shown in FIG. 2, the safety fence main body 11 is a steel plate with a thickness t1 bent to have an internal diameter Rw. A radius (Rw+t1) extending to an outer peripheral surface 11A of the safety fence main body 11, which is obtained by adding the thickness t1 to the internal diameter Rw of the safety fence, is smaller than the maximum front radius RF. The internal diameter Rw, which is the radius of the safety fence main body 11 extending to an inner peripheral surface thereof, is larger than the maximum rear radius Rr.

The opening 13 is formed along the entire length of the longitudinal axis direction of the safety fence main body 11. The movable part 20 passes the opening 13 to extend to and retract from the radially outer side of the safety fence main body 11. In the embodiment, the work table WT2 on which the work SA2 is placed is disposed on the radially outer side of the safety fence main body 11 shown in FIGS. 1 and 2.

Hereinafter, effects of the robot with a safety fence 100 of the embodiment configured in the above manner will be described.

When the robot main body 50 performs operation on the work SA1 on the front work table WT1 installed within the active region AR1, the movable part 20 of the robot main body 50 is positioned within a limited angle range around the first axis J1, and the opening 13 of the safety fence main body 11 faces roughly one direction.

In this case, the robot main body 50 is surrounded by the safety fence main body 11 over the entire periphery thereof except for the part of the opening 13. Accordingly, when the robot main body 50 is performing operation on the work SA1 on the work table WT1, even if a worker WK comes, from the radially outer side, to a position where he/she may come into contact with the safety fence main body 11, the safety fence main body 11 can surely prevent the worker WK from coming into contact with the movable part 20 of the robot main body 50. That is, the worker WK can perform operation in a region on the rear side separated from the robot main body 50 by the safety fence main body 11, even though the region is on the inner side of the movable range of the end effector EF when the movable part 20 rotates 360 degrees about the first axis J1. Hence, space can be used effectively.

Additionally, the safety fence main body 11 of the embodiment has the outer peripheral surface 11A formed at a constant distance from the center axis. For this reason, even when the movable part 20 rotates about the first axis J1, the outer peripheral surface 11A does not vary in the radial direction, whereby interference between the worker WK and the safety fence main body 11 due to rotation of the movable part 20 can be suppressed.

Next, a robot system of a second embodiment of the present invention will be described below with reference to the drawings.

Figure 3:
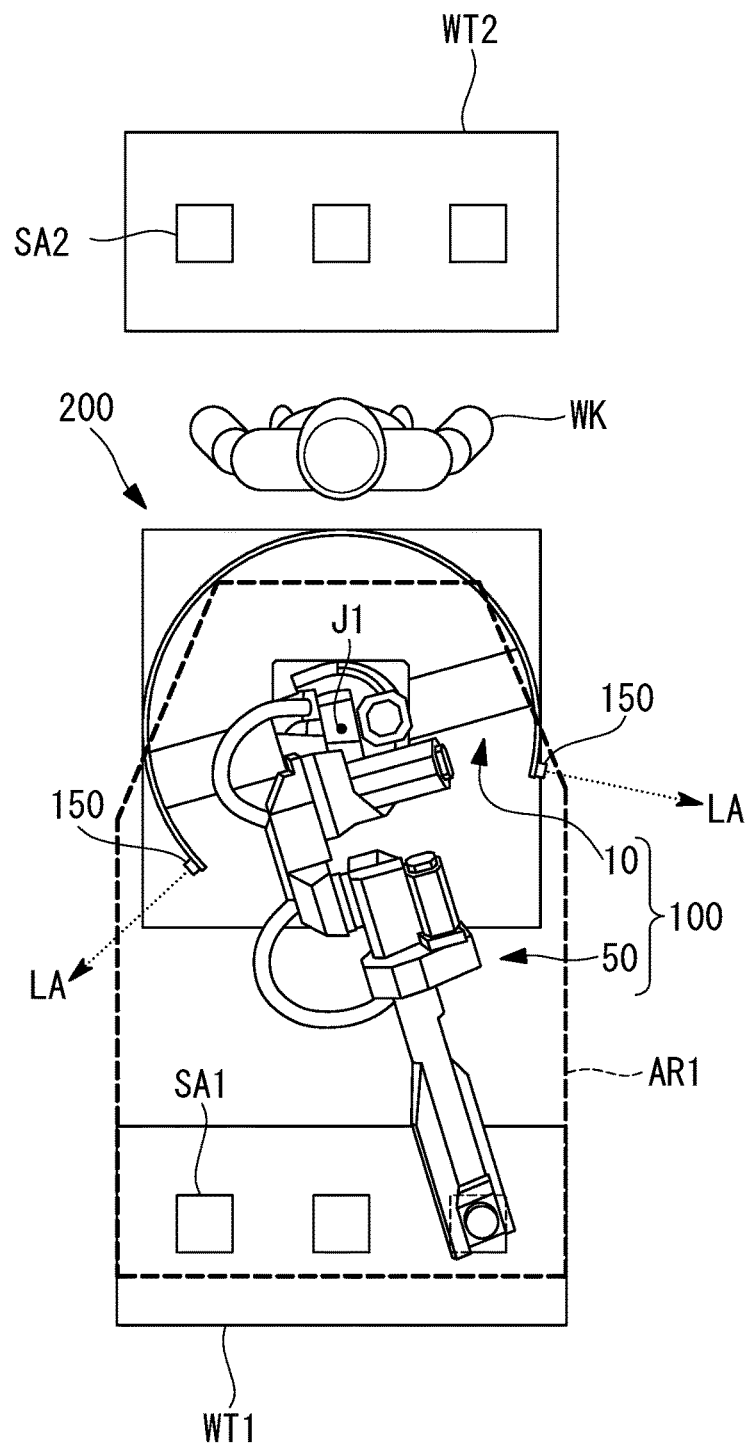
FIG. 3 is a schematic plan view of a robot with a safety fence and a robot system of an embodiment of the present invention.

FIG. 3 is a plan view of a robot system 200 of the embodiment. The robot system 200 includes a robot with a safety fence 100, and a detector 150 that detects objects such as a worker WK. The detector 150 is a laser scanner that scans a laser beam LA along a plane extending radially outward from an outer surface of the safety fence, and detects the laser beam LA reflected from an external object such as the worker WK. By attaching the detector 150 on a safety fence 10, the scanning plane of the laser beam LA can be rotated with rotation of the safety fence 10. Accordingly, the detection range can be moved to a position corresponding to the position to which the movable part 20 is rotated about a first axis J1.

According to the robot system 200 shown in FIG. 3, it is possible to detect, even outside the operation range of the movable part 20, the worker WK near a border included in the operation range of the movable part 20, for example. Hence, contact between the worker WK and the movable part 20 can be suppressed even more effectively.

The robot with a safety fence 100 and the robot system 200 of the above embodiments are examples, and various modifications can be made. For example, the robot with a safety fence 100 does not necessarily have to be a vertically articulated robot, and may be any system having a movable part 20 whose movable range during operation differs between front and rear sides around a first axis J1. The third wrist element 26 of the movable part 20 does not necessarily have to always be located on the action plane AP, and any configuration may be adopted as long as the movable range of a movable part 20 differs between front and rear sides. Moreover, the base 1 of the robot main body 50 does not have to be fixed to a floor surface, and may be fixed to an automated guided vehicle (AGV).

The shape of the safety fence main body 11 may also be modified in various ways. For example, an arbitrary section perpendicular to a predetermined axis of a safety fence main body 11 may be formed into a part of a polygon such as an octagon. On an arbitrary section perpendicular to the center axis of the safety fence main body 11, the outer peripheral surface 11A of the safety fence main body 11 is preferably included within the range of ±10 percent of a predetermined radius from the center axis of the safety fence main body 11. By forming the outer peripheral surface 11A of the safety fence main body 11 within such a range, an outer peripheral surface 11A of a safety fence main body 11 having a section perpendicular to a first axis J1 formed by cutting out a part of a regular hexagon may be adopted, for example. The thickness of the safety fence main body 11 in the radial direction is preferably ±10 millimeters (mm) from the center axis of the safety fence main body 11. By reducing the thickness of the safety fence main body 11, the weight of the safety fence 10 and the robot with a safety fence 100 can be reduced.

Additionally, an arbitrary section perpendicular to the center axis of the safety fence main body 11 may be formed into a curved shape including continuous radially outward protrusions such as a part of an oval, or an arc shape whose radius from the axis to an outer peripheral surface 11A varies along a first axis J1. Such a curved shape and arc shape may vary among arbitrary sections along the center axis, or may be a shape formed by cutting out a part of a sphere formed of circles including different radiuses. The safety fence 10 does not have to be symmetric with respect to the action plane AP.

Additionally, the safety fence main body 11 may be formed of materials other than the steel plate in the above embodiments, and may be formed of a mesh material such as a wire mesh, or may be formed of materials other than metal such as resin, for example. Moreover, the angle range around the axis where the safety fence main body 11 is disposed may differ from that in the above embodiments, and may be smaller than 180 degrees, so that no part of the safety fence main body 11 is formed on the front side. The range corresponding to the angle range may vary among arbitrary sections perpendicular to the center axis of the safety fence main body 11. Further, the opening 13 formed in the safety fence main body 11 and not restricting the operation range of the movable part 20 does not necessarily have to be formed along the entire center axis of the safety fence main body 11, and may be formed in any region within a range that does not interfere with the operation of the movable part 20.

The safety fence 10 does not necessarily have to be fixed to the revolving drum 21, and may be attached to a different part so as to be rotatable, together with the movable part 20, about the first axis J1 relative to the base 1. Additionally, the safety fence 10 does not necessarily have to rotate together with the movable part 20, and rotation of the movable part 20 and rotation of the safety fence 10 may be driven separately. For example, a drive unit separate from a revolving drum 21 may be disposed outside a base 1, and a safety fence 10 may be attached to the drive unit. In this case, the drive unit may be driven in synchronization with the revolving drum 21, or the safety fence 10 may be driven independently from the revolving drum 21. The system may be configured such that the safety fence 10 is driven only when the amount of rotation of the revolving drum 21 is large, and the safety fence 10 is kept still when the amount of rotation of the revolving drum 21 is small. The safety fence 10 may be detachable from the movable part 20. The shape and material of the fixing member 12 fixing the safety fence main body 11 and the movable part 20 may be modified in various ways.

While a laser scanner shown in FIG. 3 has been used as an example of the detector 150, the detection range and the method by which the detector 150 detects objects such as the worker WK may be modified in various ways. For example, detectors may be arranged in four corners of a base 1 shown in FIG. 2, and may detect horizontally emitted light to detect legs of a worker WK entering a region banning entry of the worker WK. Instead, a laser scanner as a detector may emit a laser beam vertically upward from a floor surface to detect a worker WK entering a predetermined region.

As a result, the above-described embodiment leads to the following aspects.

An aspect of the present invention provides a robot with a safety fence including: a base; a movable part having a base end supported to the base so as to be rotatable about a first axis, and a tip end performing operation on an operation target; and a safety fence rotated about the first axis together with the movable part, and disposed on a rear side opposite to a front side of the robot with a safety fence where the tip end of the movable part performs operation, in which the safety fence is disposed in a position radially closer to the first axis than the farthest distance the tip end of the movable part travels from the first axis on the front side, and a position radially farther away from the first axis than the farthest distance a portion of the movable part travels from the first axis during operation, on the rear side.

The entire movable range of the robot with a safety fence is set as a region including a reachable range of the tip end of the movable part when the movable part rotates 360 degrees about the first axis. However, when the angle range of the movable part rotating relative to the base is limited to a certain range on the front side, the reachable range of the movable part during operation may be smaller on the rear side of the robot with a safety fence that is out of the angle range, than on the front side. That is, on the rear side of the robot with a safety fence, when comparing a border of the reachable range of the movable part on the rear side from the first axis, and a border indicating the entire movable range of the tip end of the movable part when the movable part rotates 360 degrees about the first axis, there is a region that the movable part does not enter unless the movable part rotates about the first axis.

Here, since the safety fence is disposed farther away from the first axis than the farthest point to which the movable part travels on the rear side, the movable part during operation does not come into contact with the safety fence even when the movable part moves to the rear side. That is, the region on the rear side where the movable part does not enter during operation even through the region is included within the entire movable range of the movable part can be presented to humans as a region on the radially outer side of the safety fence. Then, it is possible to surely restrict entry of humans performing operation in the region on the radially outer side of the safety fence into the movable range of the robot on the rear side.

The above aspect may provide a vertically articulated robot with a safety fence in which: the movable part has a revolving drum supported to the base so as to be rotatable about the first axis, a first arm supported to the revolving drum so as to be rotatable about a second axis perpendicular to the first axis, and a movable tip end part supported to the vicinity of a tip end of the first arm so as to be rotatable about a third axis parallel to the second axis; and the safety fence is disposed in a position that substantially coincides, in the radial direction, with the farthest distance a base end of the movable tip end part travels from the first axis during operation, on the rear side.

In such a vertically articulated robot, the base end of the movable tip end part during operation moves to a position farthest away from the first axis on the rear side, as compared to positions of other movable parts. By disposing the safety fence in a position where it does not come into contact with the base end of the movable tip end part, the workability of the robot can be maintained, and the radially outer side of the safety fence can be presented to humans as a position where the movable part does not enter.

In the above aspect, the safety fence may include, on an arbitrary section perpendicular to the first axis, an outer peripheral surface disposed within a range of ±10% of a radius of a circle formed around the first axis.

With this configuration, the outer peripheral surface of the safety fence is included within the range of a predetermined thickness along the radial direction. Hence, irregularities on the outer peripheral surface of the safety fence in the radial direction can be suppressed. This can reduce the influence when the outer peripheral surface of the safety fence comes into contact with humans.

In the above aspect, the outer peripheral surface may have, on all sections perpendicular to the first axis, a curved shape formed of continuous radially outward protrusions.

With this configuration, since the outer peripheral surface is formed of a smooth curved surface with no irregularities, the influence when the outer peripheral surface of the rotating safety fence comes into contact with humans can be reduced.

In the above aspect, the outer peripheral surface may have, on all sections perpendicular to the first axis, an arc shape formed around the first axis.

With this configuration, the outer peripheral surface of the safety fence is located in the same radial position around the predetermined axial line. Accordingly, since the position of the outer peripheral surface does not change with rotation of the movable part about the axis, the outer peripheral surface of the safety fence does not come into contact with a human if the safety fence rotates while the position of the human is not changed from the state where he/she is not in contact with the outer peripheral surface.

In the above aspect, the safety fence may include, on an arbitrary section perpendicular to the first axis, an outer peripheral surface disposed within a range equal to or less than ±10 millimeters of a radius formed around the first axis.

With this configuration, the thickness of the safety fence in the radial direction is reduced, whereby the weight of the safety fence is reduced.

In the above aspect, the safety fence may be fixed to the movable part.

With this configuration, it is possible to achieve a simple structure in which the safety fence rotates together with the movable part about a predetermined axis relative to the base.

Another aspect of the present invention provides: a robot system including: the robot with a safety fence of the above aspect; and a detector that detects an object different from the robot with a safety fence and located within a predetermined range from the base.

According to the aspect, since an object such as a human near the robot with a safety fence is detected by use of the detector, contact between the robot with a safety fence and other objects can be suppressed.

The present invention has an effect of preventing contact between a robot and humans while allowing entry of humans into a movable range of the robot.

REFERENCE SIGNS LIST 1 base
10 safety fence
11A outer peripheral surface
20 movable part
21 revolving drum
22 first arm
29 movable tip end part
100 robot with a safety fence
150 detector
200 robot system
EF end effector (tip end)
J1 first axis
J2 second axis

The invention claimed is:

1. A robot comprising:
a base;
a movable part having a base end supported to the base so as to be rotatable about a first axis, and a tip end performing operation on an operation target;
a safety fence rotated about the first axis together with the movable part, wherein the safety fence is disposed in a position surrounding only a rear side of the robot with the safety fence without surrounding a top side of the robot, wherein the rear side is opposite a front side of the robot with the safety fence where the tip end of the movable part performs operation; and
wherein the safety fence is disposed in a position radially closer to the first axis than a farthest distance the tip end of the movable part travels from the first axis on the front side, and a position radially farther away from the first axis than the farthest distance a portion of the movable part travels from the first axis during operation, on the rear side.

2. The robot according to claim 1, wherein the movable part comprises:
a revolving drum supported to the base so as to be rotatable about the first axis;
a first arm supported to the revolving drum so as to be rotatable about a second axis perpendicular to the first axis;
a movable tip end part supported to a vicinity of a tip end of the first arm so as to be rotatable about a third axis parallel to the second axis; and
the safety fence is disposed in a position that substantially coincides, in a radial direction, with the farthest distance a base end of the movable tip end part travels from the first axis during operation, on the rear side.

3. The robot according to claim 1, wherein the safety fence includes, on an arbitrary section perpendicular to the first axis, an outer peripheral surface disposed within a range of ±10% of a radius of a circle formed around the first axis.

4. The robot according to claim 3, wherein the outer peripheral surface has, on all sections perpendicular to the first axis, a curved shape formed of continuous radially outward protrusions.

5. The robot according to claim 4, wherein the outer peripheral surface has, on all sections perpendicular to the first axis, an arc shape formed around the first axis.

6. The robot according to claim 1, wherein the safety fence includes, on an arbitrary section perpendicular to the first axis, an outer peripheral surface disposed within a range equal to or less than ±10 millimeters of a radius formed around the first axis.

7. The robot according to claim 1, wherein the safety fence is fixed to the movable part.

8. A system comprising:
the robot with the safety fence according to claim 1; and
a detector that detects an object different from the robot with the safety fence and located within a predetermined range from the base.

* * * * *